(12) United States Patent
Powell et al.

(10) Patent No.: US 6,807,988 B2
(45) Date of Patent: Oct. 26, 2004

(54) THERMOPLASTIC REINFORCED HOSE CONSTRUCTION

(75) Inventors: Steven M. Powell, Chardon, OH (US); Michael R. Swails, Madison, OH (US); William C. Fisher, Cuyahoga Falls, OH (US); Daniel S. Blasko, Kent, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 254 days.

(21) Appl. No.: 10/040,809

(22) Filed: Jan. 8, 2002

(65) Prior Publication Data

US 2002/0100516 A1 Aug. 1, 2002

Related U.S. Application Data

(60) Provisional application No. 60/264,990, filed on Jan. 30, 2001.

(51) Int. Cl.[7] ............................................... F16L 11/00
(52) U.S. Cl. ...................... 138/125; 138/141; 138/137; 138/140; 138/144
(58) Field of Search ............................... 138/141, 140, 138/137, 123–126, 129, 130, 144–146, DIG. 1

(56) References Cited

U.S. PATENT DOCUMENTS

| | | | |
|---|---|---|---|
| 3,212,528 A | * | 10/1965 | Haas ........................... 138/130 |
| 3,654,967 A | | 4/1972 | Atwell et al. ............... 138/144 |
| 3,682,201 A | | 8/1972 | Atwell et al. ............... 138/125 |
| 3,707,178 A | | 12/1972 | Miller et al. ................ 152/547 |
| 3,729,028 A | * | 4/1973 | Horvath et al. ............. 138/130 |
| 3,773,089 A | | 11/1973 | Chudgar ...................... 138/132 |
| 3,790,419 A | | 2/1974 | Atwell et al. ............ 138/130 X |
| 3,805,848 A | | 4/1974 | Chrow ......................... 138/137 |
| 3,861,973 A | | 1/1975 | Koch .......................... 156/143 |

(List continued on next page.)

FOREIGN PATENT DOCUMENTS

| | | |
|---|---|---|
| CA | 973074 | 8/1975 |
| JP | 10-169854 | 6/1998 |
| WO | WO 95/22576 | 8/1995 |
| WO | WO 00/37841 | 6/2000 |

OTHER PUBLICATIONS

Product Bulletins of TriQuest, LP (undated).

*Primary Examiner*—Patrick Brinson
(74) *Attorney, Agent, or Firm*—John A. Molnar, Jr.

(57) ABSTRACT

A flexible hose adapted construction for conveying fluids under pressure. The construction includes a core tube having a circumferential inner core tube surface and an opposing circumferential outer core tube surface. A first reinforcement layer surrounds the outer core tube surface, and is formed of one or more filaments of a first fiber. A second fiber reinforcement layer surrounds the first reinforcement layer, and is formed of one or more filaments of a second fiber. The first and second reinforcement layers are bonded together by means of a bonding agent such as an adhesive, resin, plasticizer, tackifier, or solvent, the application of which is controlled to wet only a portion of the filaments of the reinforcement layers.

30 Claims, 3 Drawing Sheets

U.S. PATENT DOCUMENTS

| | | | |
|---|---|---|---|
| 3,866,633 A | * 2/1975 | Taylor | 138/130 |
| 3,881,975 A | 5/1975 | Koch | 156/149 |
| 3,905,398 A | 9/1975 | Johansen et al. | 138/124 |
| 3,914,146 A | 10/1975 | Koch | 156/149 |
| 3,932,559 A | 1/1976 | Cantor et al. | 525/138 |
| 3,982,982 A | 9/1976 | Chudgar | 138/124 X |
| 3,988,188 A | 10/1976 | Johansen et al. | 138/125 X |
| 4,000,759 A | 1/1977 | Higbee | 138/130 |
| 4,007,070 A | 2/1977 | Busdiecker | 138/123 X |
| 4,064,913 A | 12/1977 | Busdiecker et al. | 138/125 |
| 4,111,237 A | 9/1978 | Mutzner et al. | 138/125 |
| 4,148,963 A | 4/1979 | Bourrain et al. | 428/392 |
| 4,343,333 A | 8/1982 | Keister | 138/125 |
| 4,384,595 A | 5/1983 | Washkewicz et al. | 138/127 |
| 4,522,235 A | 6/1985 | Kluss et al. | 138/130 |
| 4,585,035 A | 4/1986 | Piccoli | 138/127 |
| 4,652,475 A | 3/1987 | Haney et al. | 138/137 |
| 4,668,318 A | 5/1987 | Piccoli et al. | 156/149 |
| 4,898,212 A | 2/1990 | Searfoss et al. | 138/130 |
| 5,024,252 A | 6/1991 | Ochsner | 138/130 |
| 5,609,962 A | 3/1997 | Ouhadi | 428/480 |
| 5,826,623 A | 10/1998 | Akiyoshi et al. | 138/126 |

* cited by examiner

THERMOPLASTIC REINFORCED HOSE CONSTRUCTION

CROSS-REFERENCE TO RELATED CASES

The present application claims the benefit of the filing date of U.S. Provisional Application Ser. No. 60/264,990; filed Jan. 30, 2001.

BACKGROUND OF THE INVENTION

The present invention relates broadly to thermoplastic reinforced hoses for low, medium, or high pressure applications, and more particularly to a construction therefor which results in a hose having improved flexibility.

Thermoplastic reinforced hose is used in a variety of fluid transfer applications. In basic structure, hoses of the type herein involved may be conventionally constructed as having a tubular core surrounded by one or more reinforcement courses of natural or synthetic fiber and/or steel wire. The reinforcement courses, in turn, are protected by a surrounding outer sheath or cover which may be of the same or different material as the core tube. The cover also provides the hose with increased abrasion resistance.

The core tube, which may be a thermoplastic material such as a polyamide, polyolefin, polyvinyl chloride, fluoropolymer, or polyurethane, or a synthetic rubber material such as Buna-N or neoprene, is conventionally extruded and cooled or cured. As is detailed in U.S. Pat. Nos. 3,116,760; 3,159,183; 3,966,238; 4,952,262, if necessary, the tube may be cross-head extruded over a mandrel for support, or otherwise supported in later forming operations using air pressure and/or reduced processing temperatures.

From the extruder, the tube may be collected on a reel or other take-up device for further processing. As dispensed from the reel, the tube optionally next may be passed through an applicator for its coating with an outer layer of an adhesive material which, in the case of thermoplastic hose, may be a polyurethane or other isocyanate-based adhesive. The core tube then may be delivered through a braider and/or a spiral winder for its reinforcement with one or more surrounding layers of a wire and/or fibrous material or blend such as a monofilament, yarn, cord, yarn-wire composite, or roving. As is described in Japanese (Kokai) Publ. No. 10-169854 A2, Canadian Patent No. 973,074, and U.S. Pat. Nos. 3,654,967; 3,682,201; 3,790,419; 3,861,973; 3,905,398; 4,007,070; 4,064,913; 4,343,333; and 4,898,212, these reinforcement layers, which are applied under tension and which may be bonded to the core and to adjacent reinforcement layers, typically comprise an interwoven braid or a spiral winding of a nylon, polyester, polyphenylene bezobisoxazole, polyvinyl acetate, or aramid yarn, or a high tensile steel or other metal wire.

Following the application of the reinforcement layers, the outer cover or sheath optionally may be applied. Such cover, which may be formed as a cross-head extrusion, a moisture-cured or solvent-based dipped coating, or a spiral-wound wrapping, typically comprises an abrasion-resistant polymeric material such as a polyamide, polyolefin, fluoropolymer, polyvinyl chloride, or polyurethane. As before, an adhesive layer may be used to bond the outer cover to the reinforcement layers. Representative hose constructions, as well as manufacturing methods and materials therefor, are shown in U.S. Pat. Nos. 1,281,557; 3,566,924; 3,654,967; 3,682,202; 3,707,178; 3,773,089; 3,779,308; 3,790,419; 3,791,415; 3,805,848; 3,881,975; 3,889,716; 3,890,181; 3,905,398; 3,914,146; 3,932,559; 3,966,238; 3,982,982; 3,988,188; 4,000,759; 4,098,298; 4,111,237; 4,142,554; 4,175,992; 4,182,019; 4,148,963; 4,241,763; 4,259,991; 4,273,160; 4,294,636; 4,364,266; 4,317,000; 4,342,612; 4,343,333; 4,380,252; 4,384,595; 4,444,707; 4,456,034; 4,459,168; 4,463,779; 4,522,235; 4,537,222; 4,553,568; 4,585,035; 4,652,475; 4,668,318; 4,699,178; 4,850,395; 4,898,212; 4,952,262; 5,024,252; 5,062,456; 5,361,806; 5,609,962; 5,698,278; 5,778,940; and 5,862,623.

In normal use, such as in mobile or industrial hydraulic applications, hoses of the type herein involved may be exposed to a variety of environmental factors and mechanical stresses which cannot always be predicted. Of utmost importance to the integrity and performance of the hose is that a strong bond is achieved between the constituent parts thereof. However, while it is important to bond these parts together, it is also important that the hose not be made overly stiff so as to make it prone to kinking or fatigue or otherwise useable for certain applications.

In view of the foregoing, it will be appreciated that hose constructions must exhibit a demanding balance of chemical and physical properties. Indeed, as commercial applications for hoses continue to increase, it is believed that improvements in hose constructions would be well-received by numerous industries. Especially desired would be a construction which is flexible and light-weight, yet resistant to external stresses in a variety of mobile and industrial applications.

BROAD STATEMENT OF THE INVENTION

The present invention is directed to thermoplastic reinforced hoses, and particularly to a construction therefor which results in a hose which is resistant to environmental conditions and mechanical stresses, but which is still flexible. Accordingly, the hose construction of the invention is adapted for use in a variety of applications such as for mobile or industrial hydraulic installations specifying working pressures of between about 150–12,000 psi (1.0–82.7 MPa).

Advantageously, the hose of the present invention includes a bonding agent such as an adhesive layer which may be interposed between each successive pair of reinforcement layers to effect a strong chemical or other bond therebetween. Importantly, however, the viscosity and other physical or chemical properties of the bonding agent and/or the reinforcement are controlled so as not to saturate the reinforcement layers which would increase the stiffness and weight of the resulting hose.

In an illustrated embodiment, the hose construction of the present invention includes a core tube over which at least a pair of fibrous reinforcement layers are braided or wound to provide resistance to internal pressure. A protective cover is provided over the reinforcement layers. The innermost reinforcement layer may be bonded to the core, and the outermost reinforcement layer may be bonded to the cover, using conventional solvating techniques. Each reinforcement layer is bonded to the next outermost layer with an adhesive layer interposed therebetween. The adhesive layer, which may be a solvent-based adhesive or a resin such as a thermoplastic hot-melt, is applied so as not to saturate the reinforcement layers.

The present invention, accordingly, comprises the article and method of its manufacture possessing the construction, combination of elements, and arrangement of parts and steps which are exemplified in the detailed disclosure to follow. Advantages of the present invention include a hose construction which is light-weight, abrasion-resistant, and flexible, but which also is highly resistant to internal and external conditions and stresses. Additional advantages include a collapse-resistant, high pressure hose construction which is manufacturable in relatively long lengths and is adaptable for use in a variety of fluid transfer applications, and which, if desired, may be made electrically non-conductive or static dissipative. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
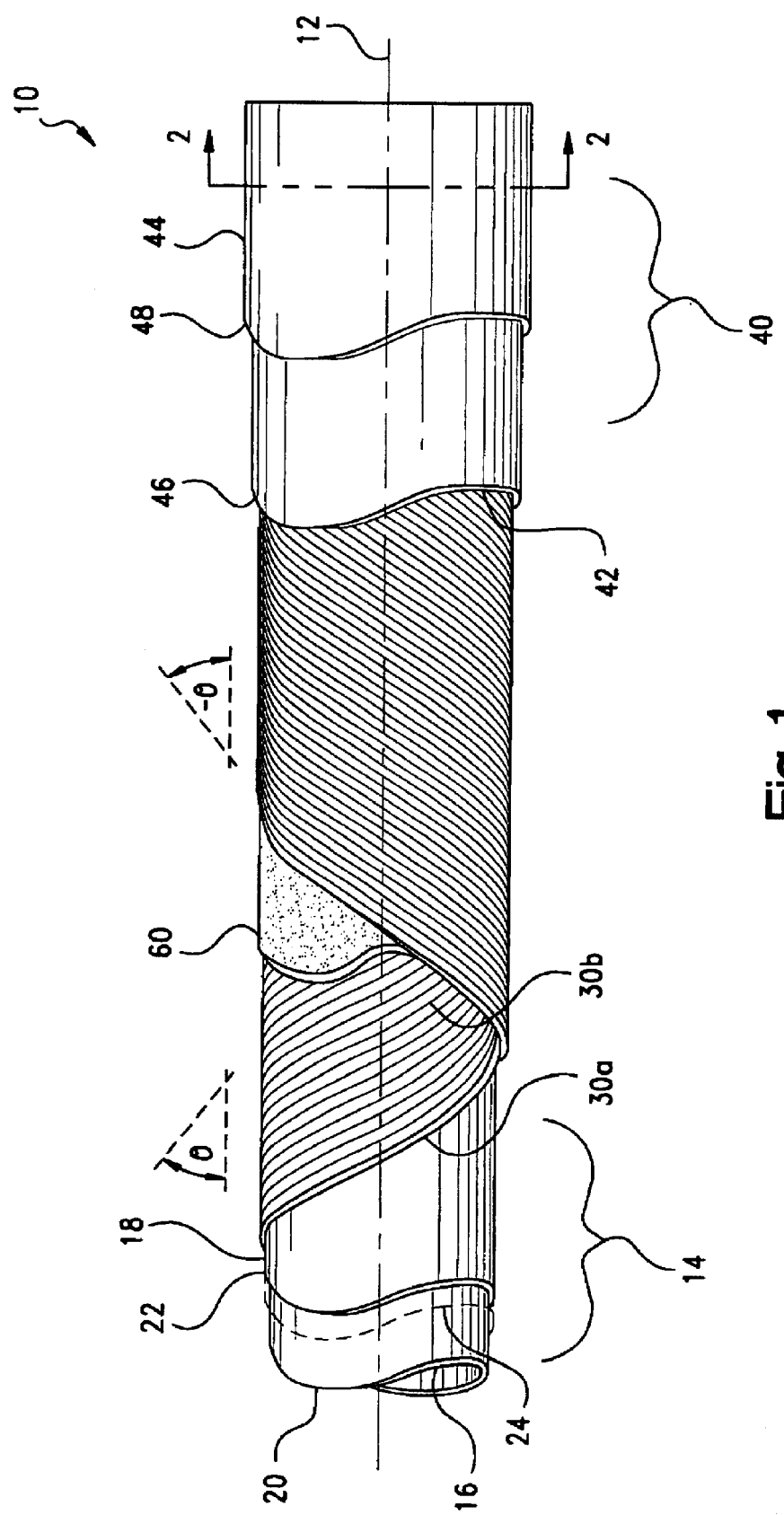
FIG. 1 is a side elevational, cut-away view of a representative embodiment of a flexible thermoplastic reinforced hose constructed in accordance with the present invention.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" and "axial" referring, respectively, to directions perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the purposes of the discourse to follow, the precepts of the composite reinforcement layer of the invention herein involved are described in connection with its utilization within a representative hose construction adapted particularly for use in medium to high pressure, i.e., about 150–12,000 psi (1.0–82.7 MPa), mobile or industrial hydraulic applications. It will be appreciated, however, that aspects of the present invention may find use in other hose constructions for a variety or general hydraulic or other fluid transfer applications. Use within those such other applications therefore should be considered to be expressly within the scope of the present invention.

Figure 2:
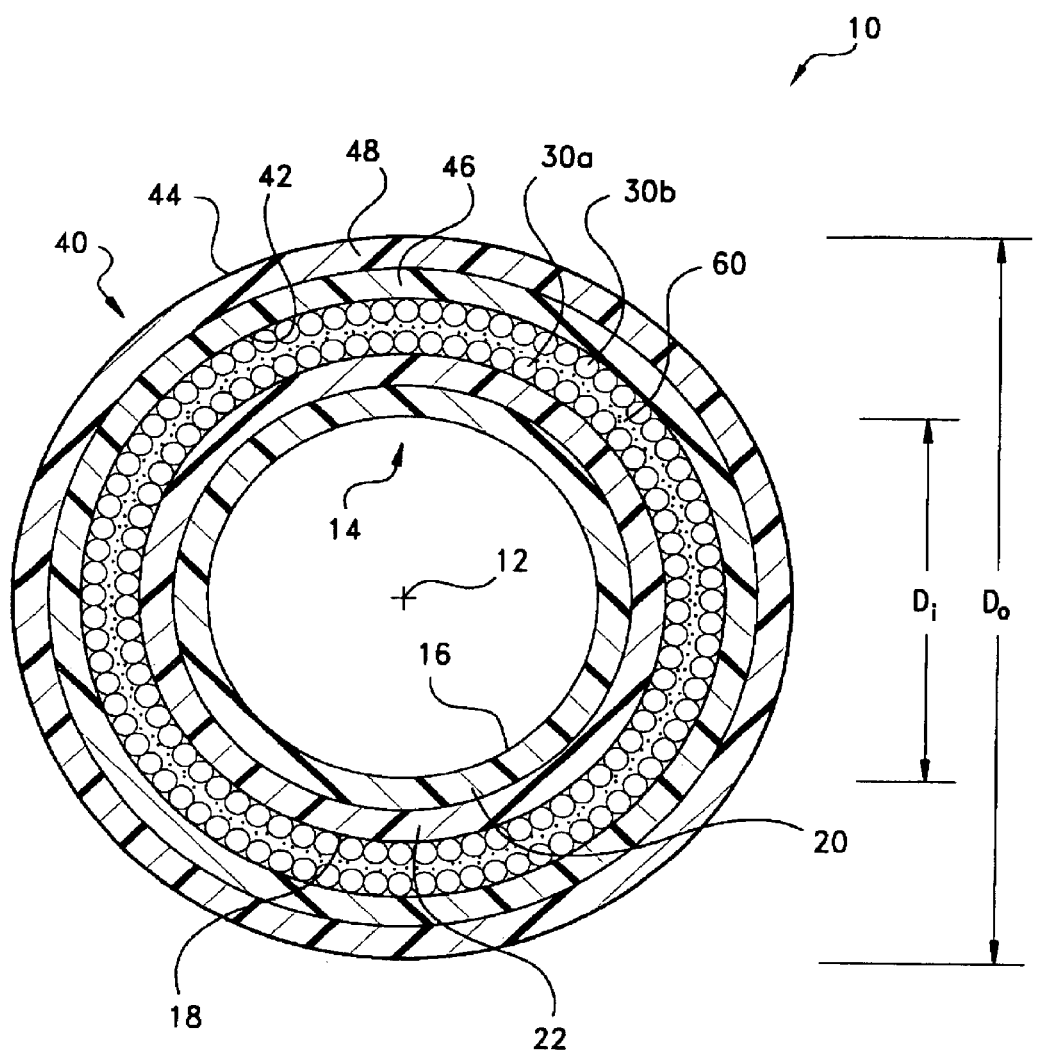
FIG. 2 is a radial cross-sectional view of the hose construction of FIG. 1 taken through line 2—2 of FIG. 1.

Referring then to the figures wherein corresponding reference numbers are used to designate corresponding elements throughout the several views, a representative hose construction according to the present invention is shown generally at 10 in the cut-away view of FIG. 1 and in the radial cross-sectional view of FIG. 2. In basic dimensions, hose 10 extends axially to an indefinite length along a central longitudinal axis, 12, and has a select inner and outer diameter referenced, respectively, at "$D_i$" and "$D_o$" in the radial cross-sectional view of FIG. 2. The inner and outer diameter dimensions may vary depending upon the particular fluid conveying application involved, but generally will be between about 3/32–2 inch (0.24–5 cm) for inner diameter $D_i$, and about 0.30–2.8 inch 0.76–7.1 cm) for outer diameter $D_o$, with a overall wall thickness, "w," therebetween of between about 0.26–0.40 inch (0.66–1.0 cm).

As may be seen in the different views of FIGS. 1 and 2, hose 10 is constructed as being formed about a tubular core, referenced at 14. Conventionally, core tube 14 may be provided as extruded from a thermoplastic material, such as a polyolefin, polyester, fluoropolymer, polyvinyl chloride, ethylene vinyl alcohol (EVA), polyacetal, polyoxymethylene (POM), silicone, thermoplastic rubber, or polyurethane, or, preferably, a polyamide such as Nylon 6, 6/66, 11, 12, or 6/12 which may be selected for chemical compatibility with the fluid being handled. Alternatively, core tube 14 may be extruded of a vulcanizable, i.e., thermosetting, or melt-processible, i.e., thermoplastic, natural or synthetic rubber such as SBR, polybutadiene, EPDM, butyl, neoprene, nitrile, polyisoprene, buna-N, copolymer rubber, or a blend such as ethylene-propylene rubber. Core tube 14 has a circumferential inner core tube surface, 16, defining the inner diameter $D_1$ of the hose 10, and a circumferential outer core tube surface, 18. As with the overall dimensions of hose 10, the wall thickness of core tube 14 may vary for the particular application envisioned, but typically will be between about 0.02–0.12 inch (0.51–3.1 mm).

Although core tube 14 may be formed of a unitary, single-layer construction, it is preferred for many applications that the core tube 14 be provided, as shown, as having a composite, multi-layer construction. In such multi-layer construction, core tube 14 includes an innermost layer or liner, 20, which defines the inner core tube surface 16, and an outermost layer, 22, which defines the outer core tube surface 18. For chemical resistance, innermost layer 20 may be provided as extruded or otherwise formed of a melt-processible thermoplastic which may be a fluoropolymer, polyamide, or co-polyester. As used herein, "chemical resistance" should be understood to mean the ability to resist swelling, crazing, stress cracking, corrosion, or otherwise to withstand attack from mild acidic or alkaline solutions, phosphate-ester solutions, and alcohols and other organic solvents and hydrocarbons, as well as inorganic solvents such as water or brine. Preferred fluoropolymers include polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetraflurorethylene (ETFE) terpolymer, polyvinylidene fluoride (PVDF), polyvinylfluoride (PVF), and copolymers and blends thereof. For cost considerations, the wall thickness of innermost layer 20 may be maintained at the minimum necessary to provide the desired solvent, gas, or liquid permeation resistance, and for most applications may be between about 2–30 mils (0.05–0.76 mm).

Outermost layer 22, in turn, is provided as being formed of a relatively flexible polymeric material which may be thermoplastic or otherwise melt-processible or, alternatively, vulcanizable or otherwise cross-linkable or thermosetting. Such material specifically may be selected for flexibility, that is, as having a lower flexural modulus than that of the material forming innermost layer 20, or otherwise for temperature performance and/or compatibility with the core tube 14. Suitable materials include plastics such as polyamides, polyesters, polyurethanes, polyolefins, polyvinyl chlorides, polyacetals, ethylene vinyl alcohols, polyoxymethylenes, natural rubbers such as Hevea and thermoplastic, i.e., melt-processible, or thermosetting, i.e., vulcanizable, synthetic rubbers such as fluoropolymer, chlorosulfonate, polybutadiene, butyl, neoprene, nitrile, polyisoprene, and buna-N, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR, and copolymers and blends of any of the foregoing. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Preferably, outermost layer 22 is formed of a material which is compatible with or otherwise bondable directly to the innermost layer 20. Alternatively the two layers may be bonded, if incompatible, means of a tie layer in a manner to be described hereinafter. For strength and flexibility considerations, the wall thickness of outermost layer 22 may be thicker than that of innermost layer 20, and typically will range from about 15 mils (0.38 mm) to about 110 mils (2.8 mm).

Core layers 20 and 22 may be fabricated by extrusion, co-extrusion, or sequential extrusion and, if formed of compatible materials, thereby cross-linked or otherwise chemically or fusion bonded together at their interface into an integral, tubular composite structure. If formed of chemically dissimilar or otherwise incompatible materials, however, an adhesion-promoting surface treatment may be applied or an intermediate tie or bonding layer, shown in phantom at 24 in FIG. 1, may be co-extruded, i.e., "tri-extruded," with layers 20 and 22, or sequentially extruded or over-coated therebetween, as being formed of a material which is adhesion bond compatible with both the materials of layers 20 and 22. Preferably, intermediate layer 24 is formed of material which also is resistant to solvent permeation, and which generally is more elastic than the material forming layer 20. Suitable materials include PVDF, PVF, polyvinyl acetate (PVA), methyl acrylics, urethanes, polyvinyl chlorides, polyolefins, and copolymers, alloys, and blends thereof, as well as thermoplastic or thermosetting rubbers. The wall thickness of intermediate layer typically will be less than or about equal to the wall thickness of inner layer 20. Composite tubes of the type herein involved are further described in U.S. Pat. Nos. 3,561,493; 5,076,329; 5,167,259; 5,284,184; 5,383,087; 5,419,374; 5,460,771; 5,469,892; 5,500,257; 5,554,425; 5,566,720; 5,622,210; 5,678,611; and 5,743,304, and are marketed commercially by ITT Automotive, Inc. (Auburn Hills, Mich.) and by Pilot Industries, Inc. (Dexter, Mich.).

With respect to the spiral-wound construction shown in FIGS. 1 and 2, at least two as is shown, and up to eight or more, reinforcement layers, 30a–b, are provided over the core tube 14. Each of the reinforcement layers 30 may be conventionally formed as braided, knitted, wrapped, or, as is shown, spiral, i.e., helically, wound of, for example, from 1 to about 60 ends of monofilament, continuous multifilament, i.e., yarn, stranded, cord, roving, thread, tape, or ply, or short "staple" strands of a fiber material. The fiber material, which may be the same or different in layers 30a–b, may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend, a steel, which may be stainless or galvanized, brass, zinc or zinc-plated, or other metal wire, or a blend thereof. In a braided construction (not shown), which also may contain additional spiral wound, wrapped, and/or knitted layers, each of the reinforcement layers may be braided under tension at a pitch angle of between about 45–63° using from between 12–96 carriers each having from 1 to about 32 ends of a 420–6600 denier (470–7400 decitex), multi-filament aramid, polyester, nylon, PVA, or PBO yarn.

In the illustrated spiral wound construction 10 of FIGS. 1 and 2, which also may contain additional braided and/or knitted layers (not shown), the reinforcement layers 30 are oppositely wound in pairs so as to counterbalance torsional twisting effects. For each of the spiral wound layers 30a–b, from 1 to about 60 parallel ends of, preferably, a 420–6600 denier (470–7400 decitex), multi-filament aramid, polyester, nylon, PVA, or PBO yarn may be helically wound under tension in one direction, i.e., either left or right hand, with the next immediately succeeding layer 30 being wound in the opposite direction. The layers 30a–b may be wound as is shown in FIG. 1 directly over the outer surface 18 of core 14, or, alternatively, over one or more intervening reinforcement layers, as having a predetermined pitched angle, referenced at $\theta$ in FIG. 1 for layer 30a and at $-\theta$ for layer 30b, measured relative to the longitudinal axis 12 of the hose 10. The layers further may be wound with the yarn or other end having a clockwise or counterclockwise twist of between 0 and about 2 turns per centimeter which may be imparted as supplied by the manufacturer, i.e., manufacturer's twist, or as is imparted as the ends are spooled. As is known in the art, the twist may be varied to optimize for example, the flexural fatigue and/or pressure resistance of the hose or to minimize the hose diameter or cost.

For typical applications, the pitch angle $\theta$ will be selected to be between about 40–65°, but particularly may be selected depending upon the desired convergence of strength, elongation, weight, and volumetric expansion characteristics of hose 10. In general, higher pitch angles above about 54.7° exhibit decreased radial expansion of the hose under pressure, but increased axial elongation. For high pressure applications, a "neutral" pitch angle of about 54.7° generally is preferred as minimizing elongation to about ±3% of the original hose length. Each of the layers 30 may be wound at the same or different absolute pitch angle, and it is known that the pitch angles of respective reinforcement layers may be varied to affect the physical properties of the hose. In a preferred construction, however, the pitch angles of reinforcement layers 30a–b are provided to about the same, but as reversed in successive layers.

Importantly, the tension and area coverage at which the reinforcement layers 30 are braided, wound, or knitted may be varied to achieve the desired flexibility, which may be measured by bend radius, flexural forces, or the like, of the hose 10. For the spiral wound layers 30a–b depicted in FIGS. 1 and 2, the constituent yarns or other ends generally will be applied at or near about 100% coverage such that substantially no space or interstitial area exists between each successive turn, and under a tension of between about 0.12–10.0 ft-lbs (0.53–44.3 N). In this way, and as is further detailed hereinafter, the degree of wetting of the individual fiber filaments comprising the reinforcement layers 30 by an applied bonding agent, such as an adhesive, solvent, tackifier, resin, or plasticizer, may be controlled. In the case of a yarn, cord, roving, or other stranded fiber, such wetting also may be controlled by the twist thereof, which preferably is a "Z" or "S" twist of between about 0.15–3.5 turns per inch (0.6–1.38 turns per cm) of length.

To better control the elongation and contraction of hose 10, and for improved impulse fatigue life, the innermost reinforcement layer 30a may be bonded, by means of fusion, mechanical, chemical, or adhesive bonding, or a combination thereof or otherwise, to the outer circumferential outer surface 18 of the core tube 14. Preferably such bond will exhibit a strength of at least about 4 pli (pounds per linear inch) (0.72 kg/linear cm), and may be effected by solvating, tackifying, or plasticizing the core tube outer surface 18 with an appropriate solvent, such as a carboxylic or other organic acid, tackifier, or plasticizer such as an aqueous or other solution of an amine such as n-methyl pyrrolidone or a phenol such as meta-cresol or resorcinol, or with the use of a urethane, epoxy, vinyl chloride, vinyl acetate, methyl acrylic, or other adhesive having an affinity to the materials forming tube 14 and layer 30a, or otherwise in the manner described, for example, in U.S. Pat. Nos. 3,654,967; 3,682,201; 3,773,089; 3,790,419; 3,861,973; 3,881,975; 3,905,398; 3,914,146; 3,982,982; 3,988,188; 4,007,070; 4,064,913; 4,343,333; 4,898,212; and in Japanese (Kokai) Publ. No. 10-169854 A2 and Canadian Patent No. 973,074.

The outermost reinforcement layer 30b, in turn, may be sheathed within one or more layers of a coaxially-surrounding protective cover or jacket, referenced at 40, having a circumferential interior surface, 42, and an opposing circumferential exterior surface, 44. Depending upon its construction, cover 40 may be spray-applied, dip coated, cross-head or co-extruded, or otherwise conventionally extruded, spiral or longitudinally, i.e., "cigarette," wrapped, or braided over the reinforcement layer 30b as, for example, a 0.02–0.15 inch (0.5–3.8 mm) thick layer of an abrasion-resistant, preferably melt-processible, thermoplastic material, copolymer, alloy, or blend of a fiber, glass, ceramic, or metal-filled or unfilled polyamide, polyolefin, polyester, polyvinyl chloride, fluoropolymer, thermoplastic rubber (TPR), thermoplastic elastomer (TPE), thermoplastic olefin (TPO), or, most preferably, a thermoplastic polyurethane (TPU) elastomer. By "abrasion-resistant," it is meant that such thermoplastic material for forming cover 30 may have a hardness of between about 60–98 Shore A durometer. As with core 14, cover 40 alternatively may be formed of a vulcanizable natural or synthetic rubber such as SBR, polybutadiene, EPDM, butyl, neoprene, nitrile, polyisoprene, silicone, fluorosilicone, buna-N, copolymer rubbers, or blends such as ethylene-propylene rubber. Any of these materials forming cover 60 may be loaded with metal particles, carbon black, or another electrically-conductive particulate, flake, or fiber filler so as to render hose 10 electrically-conductive for static dissipation or other applications. Separate electrically-conductive fiber or resin layers (not shown), which may be in the form of spiral or "cigarette-wrapped" tapes or otherwise provided, also may be included in the hose construction 10 between the core 14 and the innermost reinforcement layer 30a, between the reinforcement layers 30, or between the outermost reinforcement layer 30b and cover 40.

Similar to the bonding of core 14 to the innermost reinforcement layer 30a, the interior surface 42 of cover 40 may be bonded to the outermost reinforcement layer 30b. Such bond, again, may be by fusion, chemical, mechanical, or adhesive means, or a combination thereof or other means, and preferably will exhibit a strength of at least about 8 pli (1.43 kg/linear cm). As before, the bond may be effected by solvating, tackifying, or plasticizing the surface of the outermost reinforcement layer 30b with an appropriate solvent, such as a carboxylic or other organic acid, tackifier, or plasticizer such as an aqueous or other solution of an amine such as n-methyl pyrrolidone or a phenol such as meta-cresol or resorcinol, or with the use of a urethane or other adhesive having an affinity to the materials forming reinforcement layer 30b and cover 40, or otherwise in the manner described in the above-cited references or in the manner to be described in connection with the bonding between layers 30a–b.

In the illustrative multi-layer construction of cover 40 shown in FIGS. 1 and 2, cover 40 is provided as having an innermost cover layer, 46, which is formed of a first, preferably, thermoplastic material and which defines the interior cover surface 42, and a surrounding outermost cover layer, 48, which is formed of a second, preferably, thermoplastic material and which defines the exterior cover surface 44. Depending upon the application, the relative thicknesses of the layers 46 and 48 may be different or about the same. However, to further enhance the flexibility of hose 10, the first thermoplastic material forming the innermost cover layer 46 may be selected has having a flexural modulus which is lower than the flexural modulus of the outermost cover layer 48. In this way, the thickness of the less flexible outermost cover layer 48 may be decreased as compared to a single layer construction of cover 40. Although many combinations of materials may be used, the first thermoplastic material forming the more flexible innermost layer 46 may be a polyamide, polyolefin, polyester, EVA, TPO, TPE, TPU, TPR, fluoroelastomer or other fluoropolymer, polyvinyl chloride, silicone, polyurethane, a natural or synthetic rubber, or a copolymer of blend thereof, with the second material being, independently, a less flexible but harder, i.e., at least about 60 Shore A durometer, filled or unfilled polyamide, polyurethane, polyester, polyolefin, fluoropolymer, TPE, ionomer resin such as "Surlyn®" (DuPont, Wilmington, Del.), or a copolymer or blend thereof. If formed of chemically compatible thermoplastic materials, the respective layers 44 and 46 may be fusion bonded together at their interface. Alternatively, if formed of chemically incompatible materials, the respective layers 44 and 46 may be bonded together with an adhesive or by means of a surface treatment or tie layer (not shown) interposed therebetween.

Returning to FIGS. 1 and 2, each of the reinforcement layers, such as layer 30a, within hose 10 is bonded, typically chemically and also, in most instances, mechanically, to its immediately succeeding layer, such as layer 30b, so as to provide for the more efficient transfer of induced internal or external stresses. By "chemically bonded," it is meant that the layers are bonded together, such as by fusion or cross-linking, directly or indirectly through an intermediate adhesive, resin, or other interlayer, as referenced at 60 in FIGS. 1 and 2, such that atoms of the materials forming the reinforcement layers 30*a–b* are bonded to atoms of the other layer 30*a* or 30*b* or to atoms of the material forming interlayer 60. The chemical bond may be either covalent, ionic, or hydridic, i.e., hydrogen, bridge bonding, and results, along with any mechanical bonding, in the formation of an integral reinforcement structure exhibiting, for example, an interlayer bond, i.e., 270° peel strength per ASTM D413-98, "Standard Test Methods for Rubber Property-Adhesion to Flexible Substrates," of at least about 6.0 pli (1.07 kg/linear cm). However, in accordance with the precepts of the present invention, the radial penetration or other "wetting" of the individual filaments of the fibers forming the reinforcement layers 30 by the applied liquid form of a bonding agent, which may be an adhesive, resin, plasticizer, tackifier, solvent, or the like, is minimized or otherwise controlled such that substantially only the surface filaments or other portion of the filaments of those fibers are contacted by the bonding agent. In this way, the remainder of the filaments are not bound and thereby remain free to elongate or otherwise flex in affording optimum and consistent stress distribution. Typically, the wetted portion of the filaments will be a minor portion of the reinforcement fibers, i.e., between about 0.5–20% by either a total weight, filament number, or volume average, with the major portion being the unwetted balance.

In an illustrative embodiment, the bonding agent is provided as an adhesive in the form of a melt-processible or vulcanizable material which is extruded or otherwise applied in a molten, softened, or otherwise flowable phase over the reinforcement layer 30*a* to form the interlayer referenced at 60 in FIGS. 1 and 2 which may have a thickness of between about 1–25 mils (0.025–0.64 mm). The reinforcement layer 30*b* then may be wound over the interlayer 60 while it is still in its softened phase. Alternatively in the case of a thermoplastic interlayer 60, the layer may be reheated to effect its re-softening prior to the winding of reinforcement layer 30*b*. "Soften" is used herein in its broadest sense to indicate a transition from a form-stable crystalline or glassy solid phase to a flowable liquid, semi-liquid, or otherwise viscous phase which may be generally characterized as exhibiting intermolecular chain rotation. For any number of reinforcement layers 30 provided in the construction of hose 10, a separate interlayer 60 may be interposed between each layer 30 and each successive layer 30 to effect a bond in accordance with the present invention therebetween.

The material forming interlayer 60 specifically may be selected for high temperature performance, flexibility, or otherwise for compatibility with the reinforcement layers 30. Suitable materials include natural rubbers such as Hevea and thermoplastic, i.e., melt-processible, or thermosetting, i.e., vulcanizable, resins which should be understood to also include, broadly, materials which may be classified as elastomers or hot-melts. Representative resins include plasticized or unplasticized polyamides such as nylon 6, 66, 11 and 12, polyesters, copolyesters, ethylene vinyl acetates, polybutylene or polyethylene terephthalates, polyvinyl chlorides, polyolefins, fluoropolymers, thermoplastic elastomers, thermoplastic hot-melts, copolymer rubbers, blends such as ethylene or propylene-EPDM, EPR, or NBR, polyurethanes, and silicones. In the case of thermoplastic resins, such resins typically will exhibit softening or melting points, i.e., Vicat temperatures, of between about 77–250° C. For amorphous or other thermoplastic resins not having a clearly defined melting peak, the term melting point also is used interchangeably with glass transition point.

Depending upon the composition of the layers 30*a–b* vis-à-vis that of interlayer 60, the material forming interlayer 60 may be modified with between about 0.1–15.0% by total weight of an adhesion promoter such as maleic anhydride, methylmethacrylate, poly-hydroxystryene, or a blend, alloy, or mixture thereof. Such promoter assists in the formation of chemical bonds between the layers, and, in the case of thermoplastic resin materials, increases temperature resistance without a corresponding increase in flexural modulus. Similar treatments also may be applied to the fiber materials forming the reinforcement layers 30. Such treatments, and as is described further in International (PCT) Publ. No. WO 95/22576, may involve an adhesive system which comprises an isocyanate and one or more polyunsaturated heteroatom polymers. Alternatively, a more conventional resorcinol-formaldehyde-latex (RFL) treatment may be employed.

The material forming interlayer 60, or in one or more of the interlayers 60 which may be near or spaced-apart from the core tube 14 in a construction 10 having more than two reinforcement layers 30, also may be loaded with metal particles, carbon black, or another electrically-conductive filler so as to render hose 10 electrically-conductive for static dissipation or other applications. Conversely, by selection of a hydrophobic fiber for the reinforcement layers 30*a–b* and the use of a resin as the bonding agent therefor, an electrically non-conductive spiral wound or other hose construction may be produced.

Interlayer 60 alternatively may be provided as a co-extrusion, laminate, or other composite system formed of two or more successive layers with each of the layers formed of a different resin selected, for example, as being compatible with or otherwise having an affinity to an adjacent reinforcement layer 30. In this way, reinforcement layers 30*a–b* which are formed of materials having differing chemical compositions effectively may be joined across a composite interlayer 60. If the different resins within the respective layers of the composite interlayer 60 are themselves incompatible, one or more intermediate tie layers formed of one or more compatibilizing resins may be provided between the incompatible resin layers to effect a bond across the entirety of the interlayer 60. Representative examples of a two-layer resin system for interlayer 60 include polyvinyl chloride-polyester, polyamide-polyurethane, polyester and copolyester-urethane, polyvinylidene fluoride-polyurethane, and polyolefin-polyester combinations. Each of the resins within the respective layers of the composite interlayer 60 may compounded with an adhesion promoter or otherwise filled or modified in the manner described hereinbefore.

In an alternative embodiment, a conventional moisture cure urethane, or an epoxy, silicone, or other adhesive may be substituted for the resin forming interlayer 60. In another alternative embodiment, the reinforcement layers 30 may be bonded together directly by solvating, plasticizing, or tackifying the filaments of the fibers forming the reinforcements layers 30. In such alternative embodiment, the bonding agent may be provided as a solvent, such as an organic acid, or as an aqueous or other solution of a tackifier or plasticizer which may be an amine such as n-methyl pyrrolidone or a phenol such as meta-cresol or resorcinol. The solution may be coated over the reinforcement layer 30*a*, such as by passing the hose carcass through a bath thereof. With a reinforcement layer 30*a* thus being softened, the reinforcement layer 30*b* then may be wound thereon to bond the two layers, such as by fusion, into an integral structure, with the layer 30*b* likewise being softened by a film of the plasticizer, solvent, or tackifier which may be adherent on the reinforcement layer 30*a*.

Figure 3A:
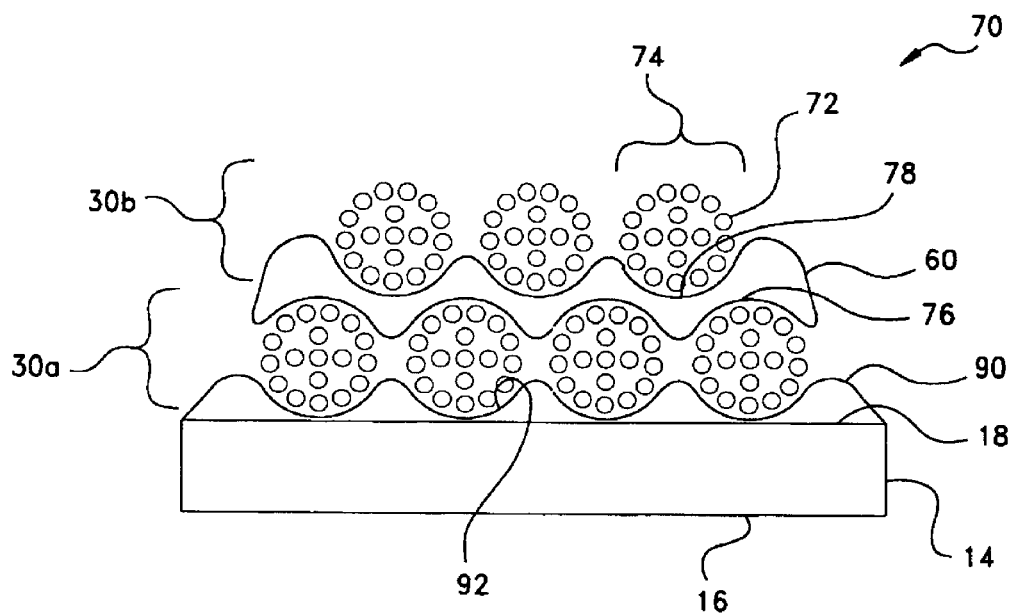
FIG. 3A is a schematic depiction of the radial cross-sectional view of FIG. 2 which is magnified to reveal the details thereof.
Figure 3B:
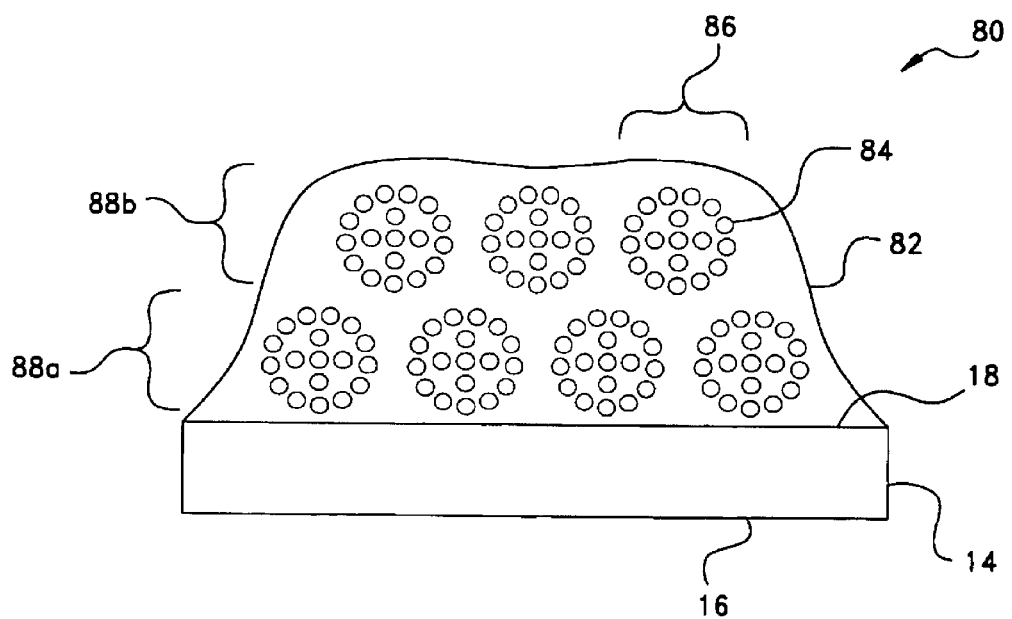
FIG. 3B is a comparative schematic depiction of a hose construction representative of the prior art.

Importantly, the viscosity of the adhesive, resin, solvent, plasticizer, tackifier, or other bonding agent which is extruded, coated, sprayed or otherwise applied over the reinforcement layer 30a is controlled, either intrinsically or by the addition, selection, or modification of carriers, thickeners, or other adjuvants, to be at least, for example, about 20,000 centipoise so as to limit its saturation of the filaments of the fibers forming the reinforcement layers 30. In this regard, reference may be had to FIG. 3A wherein a magnified radial cross-sectional view of hose 10 of FIGS. 1 and 2 is depicted schematically at 70. As is may be seen in FIG. 3A, the penetration of the adhesive interlayer 60 into the individual filaments, one of which is referenced at 72, of the yarns, 74, forming reinforcement layers 30a–b is limited such that the majority of the filaments 72 are not contacted and, accordingly, bonded by the adhesive layer 60. Rather, it is substantially only the circumferential outer and inner surfaces, referenced respectively at 76 and 78, defined by a corresponding inner and outer course of filaments of the fibers forming the reinforcement layers 30a and 30b, which are wetted and bonded by the adhesive layer 60. In contrast, and as may be seen with reference to the comparative view of the prior art referenced at 80 in FIG. 3B, the adhesive layer 82 believed heretofore known in the art substantially completely saturates the individual filaments 84 of the yarns 86 forming the reinforcement layers 88a–b with the result of a heavier and less flexible hose.

As may be seen at 90 with reference again to FIG. 3A, a second adhesive layer 60 also may be used to bond the innermost reinforcement layer 30a to the outer core tube surface 18. As before, the viscosity of the adhesive, resin, solvent, plasticizer, tackifier, or other bonding agent which is extruded, coated, sprayed, or otherwise applied over the core tube 14 is controlled so as to limit its saturation of the filaments of the fibers forming the reinforcement layer 30a. In this regard, it is substantially only the circumferential inner surface, referenced at 92, defined by an inner course of filaments of the fibers forming the reinforcement layer 30a which is wetted and bonded by the adhesive layer 92. In contrast, and as may be seen with reference again to the comparative view of the prior art referenced at 80 in FIG. 3B, the adhesive layer 82 believed heretofore known in the art substantially completely saturates the individual filaments 84 of the yarns 86 forming the reinforcement layer 88a in the bonding of that layer to the core tube outer surface 18.

In addition or as an alternative to the control of the bonding agent viscosity, the penetration thereof into the reinforcement may be controlled by the tension or coverage of the yarn or other fibers forming the reinforcement and/or, in the case of a yard, cord, roving, or other stranded fiber, via its twist. In this way, the apparent or effective porosity of the reinforcement relative to the bonding agent may be decreased with a resultant decrease in the saturation or other wetting of the reinforcement by the bonding agent. In general, higher coverages, tensions, and twists will be observed to have the effect of rendering the fibers and, accordingly, the reinforcement layers formed thereby, less porous.

Alternatively, reinforcement layers 30a–b may be knitted, braided, or wound from one or more ends of a yarn comprised of a blend or cord or other ply of filaments of a first fiber and a second fiber different from the first fiber. As before, the yarns forming the first and second reinforcement layers 30a–b may be the same or different. However, the first fiber now is selected, by way of polarity, surface energy, or other chemical or physical property such as tension or twist to be preferentially wetted by the bonding agent, with the second fiber being selected to be substantially not wetted by the bonding agent. In this way, the degree of saturation of the reinforcement layers 30 by the bonding agent again may be controlled. Similarly, rather than using a yarn which is a ply or blend of different fibers, two or more different yarns, having the same or different fibers, may be used in the winding, braiding, or knitting of each of the reinforcement layers 30, with the yarns again being selected, on the basis of filament count or denier, polarity, surface energy, or other chemical or physical property to effect the desired degree of saturation by the bonding agent. Indeed, the yarns also may be formed of the same fiber with one of the yarns being coated with a resin or otherwise treated or tensioned or twisted so as to increase or decrease, as the case may be, its degree of saturation by the bonding agent. In hoses 10 of such construction, one of the fiber types employed may be selected as being "sacrificial" as having an affinity to preferentially bond with the bonding agent, while one or more of the other fiber types employed may be selected has having a lesser or substantially no affinity to bond with the bonding agent and to thereby remain more flexible in the construction for increased reinforcement capability.

Although the illustrative hose 10 has been described wherein two spiral wound reinforcement layers 30 are employed, other constructions may be envisioned based upon the disclose contained herein. For example, and as was mentioned, the spiral wound layers 30 may be used in combination with one or more braided and/or knitted layers, which may be formed of natural, synthetic, or metal fiber, depending upon the specific requirements of the particular application involved.

Thus, an illustrative hose construction is described which results in efficient load transfer between the respective component layers thereof. Such a construction, which may be entirely thermoplastic, rubber, or a combination thereof, is particularly adapted for a variety of hydraulic and other fluid power applications and, as a result of a unique bonded reinforcement construction, is believed to exhibit improved flexibility and performance life with reduced weight as compared to the hoses heretofore known in the art.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. A flexible hose adapted for conveying fluids under pressure, said hose extending in an axial direction along a central longitudinal axis to an indefinite length, and in a radial direction circumferentially about said longitudinal axis, said hose comprising:

a core tube having a circumferential inner core tube surface and an opposing circumferential outer core tube surface;

a first reinforcement layer surrounding the outer core tube surface, said first reinforcement layer being formed of one or more filaments of at least a first fiber and being spiral wound in a first winding direction around the outer core tube surface from one or more ends of a first yarn comprised of filaments of at least said first fiber; and at least a second fiber reinforcement layer surrounding said first reinforcement layer, said second reinforcement layer being formed of one or more filaments of at least a second fiber and being spiral wound in a second winding direction opposite said first winding direction around said first reinforcement layer from one or more ends of a second yarn comprised of filaments of at least said second fiber, wherein said second reinforcement layer is bonded to said first reinforcement layer by a bonding agent, only a portion of the filaments of said first reinforcement layer and of said second reinforcement layer being wetted by said bonding agent.

2. A flexible hose adapted for conveying fluids under pressure, said hose extending in an axial direction along a central longitudinal axis to an indefinite length, and in a radial direction circumferentially about said longitudinal axis, said hose comprising:

a core tube having a circumferential inner core tube surface and an opposing circumferential outer core tube surface;

a first reinforcement layer surrounding the outer core tube surface, said first reinforcement layer being formed of one or more filaments of at least a first fiber; and at least a second fiber reinforcement layer surrounding said first reinforcement layer, said second reinforcement layer being formed of one or more filaments of at least a second fiber, wherein said second reinforcement layer is bonded to said first reinforcement layer by a bonding agent, only a portion of the filaments of said first reinforcement layer and of said second reinforcement layer being wetted by said bonding agent, and wherein said filaments forming said first reinforcement layer and said filaments forming said second reinforcement layer each are treated with an adhesion promoter.

3. A flexible hose adapted for conveying fluids under pressure, said hose extending in an axial direction along a central longitudinal axis to an indefinite length, and in a radial direction circumferentially about said longitudinal axis, said hose comprising:

a core tube having a circumferential inner core tube surface and an opposing circumferential outer core tube surface, said core tube comprising an innermost core tube layer of a chemically-resistant first thermoplastic material which defines said inner core tube surface, and an outermost core tube layer of a second thermoplastic material which defines said outer core tube surface, said second thermoplastic material having a flexural modulus which is lower than the flexural modulus of said first thermoplastic material;

a first reinforcement layer surrounding the outer core tube surface, said first reinforcement layer being formed of one or more filaments of at least a first fiber; and at least a second fiber reinforcement layer surrounding said first reinforcement layer, said second reinforcement layer being formed of one or more filaments of at least a second fiber, wherein said second reinforcement layer is bonded to said first reinforcement layer by a bonding agent, only a portion of the filaments of said first reinforcement layer and of said second reinforcement layer being wetted by said bonding agent.

4. A flexible hose adapted for conveying fluids under pressure, said hose extending in an axial direction along a central longitudinal axis to an indefinite length, and in a radial direction circumferentially about said longitudinal axis, said hose comprising:

a core tube having a circumferential inner core tube surface and an opposing circumferential outer core tube surface;

a first reinforcement layer surrounding the outer core tube surface, said first reinforcement layer being formed of one or more filaments of at least a first fiber;

at least a second fiber reinforcement layer surrounding said first reinforcement layer, said second reinforcement layer being formed of one or more filaments of at least a second fiber; and a cover surrounding said second fiber reinforcement layer, said cover comprising an innermost cover layer of a first thermoplastic material which defines a circumferential interior cover surface, and an outermost cover layer of a second thermoplastic material which defines a circumferential exterior cover surface, said first thermoplastic material having a flexural modulus which is lower than the flexural modulus of said second thermoplastic material, and said second thermoplastic material having a hardness of at least about 60 Shore A durometer, wherein said second reinforcement layer is bonded to said first reinforcement layer by a bonding agent, only a portion of the filaments of said first reinforcement layer and of said second reinforcement layer being wetted by said bonding agent.

5. A flexible hose adapted for conveying fluids under pressure, said hose extending in an axial direction along a central longitudinal axis to an indefinite length, and in a radial direction circumferentially about said longitudinal axis, said hose comprising:

a core tube having a circumferential inner core tube surface and an opposing circumferential outer core tube surface;

a first reinforcement layer surrounding the outer core tube surface, said first reinforcement layer being formed from one or more ends of a first yarn comprised of one or more filaments of at least a first fiber; and at least a second fiber reinforcement layer surrounding said first reinforcement layer, said second reinforcement layer being formed from one or more ends of a second yarn comprised of one or more filaments of at least a second fiber, and being bonded to said first reinforcement layer by a bonding agent, only a portion of the filaments of said first reinforcement layer and of said second reinforcement layer being wetted by said bonding agent, wherein said first yarn has an outer course of filaments of said first fiber which defines a circumferential first outer reinforcement surface disposed adjacent said second reinforcement layer, and said second yarn has an inner course of filaments of said second fiber which defines a circumferential second inner reinforcement surface disposed adjacent said first reinforcement layer, and wherein substantially only said outer course of filaments of said first reinforcement layer and substantially only said inner course of filaments of said second reinforcement layer is wetted by said bonding agent.

6. A flexible hose adapted for conveying fluids under pressure, said hose extending in an axial direction along a central longitudinal axis to an indefinite length, and in a radial direction circumferentially about said longitudinal axis, said hose comprising:

a core tube having a circumferential inner core tube surface and an opposing circumferential outer core tube surface;

a first reinforcement layer surrounding the outer core tube surface, said first reinforcement layer being formed from one or more ends of a first yarn comprised of a blend or cord of one or more filaments of at least a first fiber filaments and a third fiber different from said first fiber; and at least a second fiber reinforcement layer surrounding said first reinforcement layer, said second reinforcement layer being formed from one or more ends of a second yarn comprised of a blend or cord of one or more filaments of at least a second fiber and a fourth fiber different from said second fiber, wherein said second reinforcement layer is bonded to said first reinforcement layer by a bonding agent, only a portion of the filaments of said first reinforcement layer and of said second reinforcement layer being wetted by said bonding agent, and wherein said first and said second fiber are selected to be wetted by said bonding agent, and said third and fourth fibers are selected to be substantially not wetted by said bonding agent.

7. A flexible hose adapted for conveying fluids under pressure, said hose extending in an axial direction along a central longitudinal axis to an indefinite length, and in a radial direction circumferentially about said longitudinal axis, said hose comprising:

a core tube having a circumferential inner core tube surface and an opposing circumferential outer core tube surface;

a first reinforcement layer surrounding the outer core tube surface, said first reinforcement layer being formed from one or more ends of a first yarn comprised of one or more filaments of at least a first fiber, and one or more ends of a third yarn different from said first yarn comprised of filaments of a third fiber different from said first fiber; and at least a second fiber reinforcement layer surrounding said first reinforcement layer, said second reinforcement layer being formed from one or more ends of a second yarn comprised of one or more filaments of at least a second fiber, and one or more ends of a fourth yarn different from said second yarn comprised of filaments of a fourth fiber different from said second fiber, wherein said second reinforcement layer is bonded to said first reinforcement layer by a bonding agent, only a portion of the filaments of said first reinforcement layer and of said second reinforcement layer being wetted by said bonding agent, and wherein said first and said second fiber are selected to be wetted by said bonding agent, and said third and fourth fibers being selected to be substantially not wetted by said bonding agent.

8. The hose of claim 1 wherein said bonding agent comprises an adhesive, resin, plasticizer, tackifier, or solvent.

9. The hose of claim 1 wherein said bonding agent comprises a thermoplastic resin.

10. The hose of claim 9 wherein said thermoplastic resin is selected from the group consisting of polyamides, polyesters, polyolefins, fluoropolymers, silicones, polyvinyl chlorides, thermoplastic elastomers, and thermoplastic hot-melts.

11. The hose of claim 1 wherein said bonding agent is a plasticizer, tackifier, or solvent which comprises an organic acid, a phenol, or an amine.

12. The hose of claim 1 wherein:

said first yarn as spiral wound over said core tube has an outer course of filaments of said first fiber which defines a circumferential first outer reinforcement surface disposed adjacent said second reinforcement layer, substantially only said outer course of filaments of said first reinforcement layer being wetted by said bonding agent; and said second yarn as spiral wound over said first reinforcement layer has an inner course of filaments of said second fiber which defines a circumferential second inner reinforcement surface disposed adjacent said first reinforcement layer, substantially only said inner course of filaments of said second reinforcement layer being wetted by said bonding agent.

13. The hose of claim 1 wherein said core tube is formed of one or more layers of a polymeric material selected, independently, from the group consisting of polyamides, polyesters, polyacetals, ethylene vinyl alcohol, polyoxymethylene, polyolefins, silicones, fluoropolymers, polyvinyl chloride, polyurethanes, natural and synthetic rubbers, and copolymers and blends thereof.

14. The hose of claim 1 wherein said core tube comprises an innermost core tube layer of a first thermoplastic material which defines said inner core tube surface, and an outermost core tube layer of a second thermoplastic material which defines said outer core tube surface.

15. The hose of claim 3 wherein said first thermoplastic material comprises a fluoropolymer, and wherein said second thermoplastic material is selected, independently, from the group consisting of polyamides, polyolefins, polyvinyl chlorides, polyurethanes, polyesters, polyacetals, ethylene vinyl alcohol, polyoxymethylene, silicones, thermoplastic rubbers, fluoropolymers, polyolefins, and copolymers and blends thereof.

16. The hose of claim 3 wherein said first fiber and said second fiber are selected, independently, from the group consisting of nylon fibers, polyester fibers, aramid fibers, polyvinyl alcohol fibers, polyvinyl acetate fibers, polyolefin fibers, polyphenylene bezobisoxazole fibers, metal wires, and blends thereof.

17. The hose of claim 16 wherein said first fiber and said second fiber are the same.

18. The hose of claim 3 further comprising a cover surrounding said second fiber reinforcement layer.

19. The hose of claim 18 wherein said cover is formed of one or more layers of a polymeric material selected, independently, from the group consisting of polyurethanes, polyamides, polyolefins, silicones, polyesters, fluoropolymers, thermoplastic elastomers, polyvinyl chlorides, polyurethanes, natural and synthetic rubbers, and copolymers and blends thereof.

20. The hose of claim 18 wherein said cover comprises an innermost cover layer of a first thermoplastic material which defines a circumferential interior cover surface, and an outermost cover layer of a second thermoplastic material which defines a circumferential exterior cover surface.

21. The hose of claim 4 wherein said first thermoplastic material is selected from the group consisting of polyamides, polyolefins, polyvinyl chlorides, silicones, fluoropolymers, polyurethanes, natural and synthetic rubbers, and copolymers and blends thereof, and wherein said second thermoplastic material is selected, independently, from the group consisting of polyamides, polyurethanes, polyesters, polyolefins, fluoropolymers, and copolymers and blends thereof.

22. The hose of claim 18 wherein said cover has a circumferential interior cover surface and an opposing circumferential exterior cover surface, said interior cover surface being bonded to said second reinforcement layer.

23. The hose of claim 6 wherein:
said first fiber and said second fiber are the same; and
said third and said fourth fiber are the same.

24. The hose of claim 7 wherein:
said first fiber and said second fiber are the same; and
said third and said fourth fiber are the same.

25. A flexible hose adapted for conveying fluids under pressure, said hose extending in an axial direction along a central longitudinal axis to an indefinite length, and in a radial direction circumferentially about said longitudinal axis, said hose comprising:
- a core tube having a circumferential inner core tube surface and an opposing circumferential outer core tube surface;
- a first reinforcement layer surrounding the outer core tube surface, said first reinforcement layer being formed of one or more filaments of at least a first fiber; and
- at least a second fiber reinforcement layer surrounding said first reinforcement layer, said second reinforcement layer being formed of one or more filaments of at least a second fiber,
- wherein said second reinforcement layer is bonded to said first reinforcement layer by a bonding agent, only a portion of the filaments of said first reinforcement layer and of said second reinforcement layer being wetted by said bonding agent, and
- wherein the bond between said first and said second reinforcement layer is at least about 6 pli (1.07 kg/linear cm).

26. A flexible hose adapted for conveying fluids under pressure, said hose extending in an axial direction along a central longitudinal axis to an indefinite length, and in a radial direction circumferentially about said longitudinal axis, said hose comprising:
- a core tube having a circumferential inner core tube surface and an opposing circumferential outer core tube surface;
- a first reinforcement layer surrounding the outer core tube surface, said first reinforcement layer being formed of one or more filaments of at least a first fiber; and
- at least a second fiber reinforcement layer surrounding said first reinforcement layer, said second reinforcement layer being formed of one or more filaments of at least a second fiber,
- wherein said second reinforcement layer is bonded to said first reinforcement layer by a bonding agent, only a portion of the filaments of said first reinforcement layer and of said second reinforcement layer being wetted by said bonding agent, and
- wherein said portion of the filaments of said first reinforcement layer and of said second reinforcement layer being wetted by said bonding agent comprises between about 0.5–20% by total weight, number, or volume average of said filaments.

27. A flexible hose adapted for conveying fluids under pressure, said hose extending in an axial direction along a central longitudinal axis to an indefinite length, and in a radial direction circumferentially about said longitudinal axis, said hose comprising:
- a core tube having a circumferential inner core tube surface and an opposing circumferential outer core tube surface;
- a first reinforcement layer surrounding the outer core tube surface, said first reinforcement layer being formed of one or more filaments of at least a first fiber; and
- at least a second fiber reinforcement layer surrounding said first reinforcement layer, said second reinforcement layer being formed of one or more filaments of at least a second fiber,
- wherein said second reinforcement layer is bonded to said first reinforcement layer by a bonding agent which comprises a thermoplastic resin and an adhesion promoter compounded with said thermoplastic resin, only a portion of the filaments of said first reinforcement layer and of said second reinforcement layer being wetted by said bonding agent.

28. A flexible hose adapted for conveying fluids under pressure, said hose extending in an axial direction along a central longitudinal axis to an indefinite length, and in a radial direction circumferentially about said longitudinal axis, said hose comprising:
- a core tube having a circumferential inner core tube surface and an opposing circumferential outer core tube surface;
- a first reinforcement layer surrounding the outer core tube surface, said first reinforcement layer being formed of one or more filaments of at least a first fiber; and
- at least a second fiber reinforcement layer surrounding said first reinforcement layer, said second reinforcement layer being formed of one or more filaments of at least a second fiber,
- wherein said second reinforcement layer is bonded to said first reinforcement layer by a bonding agent which comprises a first resin layer disposed adjacent said first reinforcement layer and a second resin layer different from said first resin layer disposed adjacent said second reinforcement layer, only a portion of the filaments of said first reinforcement layer and of said second reinforcement layer being wetted by said bonding agent.

29. A flexible hose adapted for conveying fluids under pressure, said hose extending in an axial direction along a central longitudinal axis to an indefinite length, and in a radial direction circumferentially about said longitudinal axis, said hose comprising:
- a core tube having a circumferential inner core tube surface and an opposing circumferential outer core tube surface;
- a first reinforcement layer surrounding the outer core tube surface, said first reinforcement layer being formed of one or more filaments of at least a first fiber; and
- at least a second fiber reinforcement layer surrounding said first reinforcement layer, said second reinforcement layer being formed of one or more filaments of at least a second fiber,
- wherein said second reinforcement layer is bonded to said first reinforcement layer by a bonding agent which comprises a thermoplastic resin filled with an electrically-conductive filler to render said resin electrically-conductive, only a portion of the filaments of said first reinforcement layer and of said second reinforcement layer being wetted by said bonding agent.

30. A flexible hose adapted for conveying fluids under pressure, said hose extending in an axial direction along a central longitudinal axis to an indefinite length, and in a radial direction circumferentially about said longitudinal axis, said hose comprising:
- a core tube having a circumferential inner core tube surface and an opposing circumferential outer core tube surface;
- a first reinforcement layer surrounding the outer core tube surface, said first reinforcement layer being formed of one or more filaments of at least a first fiber; and
- at least a second fiber reinforcement layer surrounding said first reinforcement layer, said second reinforcement layer being formed of one or more filaments of at least a second fiber, wherein said second reinforcement layer is bonded to said first reinforcement layer by a bonding agent which comprises a thermoplastic resin, only a portion of the filaments of said first reinforcement layer and of said second reinforcement layer being wetted by said bonding agent, and wherein said thermoplastic resin and said filaments forming said first and said second reinforcement layer each are generally hydrophobic, said hose thereby being rendered electrically non-conductive.

* * * * *